United States Patent
Lindqvist

(10) Patent No.: US 8,443,458 B2
(45) Date of Patent: May 14, 2013

(54) METHOD AND DEVICE FOR DETECTING THE OPENING OF A COVER ENCLOSING THE DEVICE

(75) Inventor: Dan Anders Lindqvist, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 306 days.

(21) Appl. No.: 12/812,177

(22) PCT Filed: Jan. 16, 2008

(86) PCT No.: PCT/SE2008/050043
§ 371 (c)(1),
(2), (4) Date: Jul. 8, 2010

(87) PCT Pub. No.: WO2009/091301
PCT Pub. Date: Jul. 23, 2009

(65) Prior Publication Data
US 2010/0287624 A1 Nov. 11, 2010

(51) Int. Cl.
*G06F 1/26* (2006.01)

(52) U.S. Cl.
USPC ............. 726/34; 709/200; 348/152; 348/125; 348/154; 348/155; 340/853.2; 340/856.3; 340/958; 340/426.26; 340/426.28; 340/517; 340/501; 340/524; 340/539.22; 340/540; 340/541; 340/545.6; 340/545.9; 380/258; 380/52; 380/58; 726/35

(58) Field of Classification Search ............ 726/34
See application file for complete search history.

(56) References Cited

U.S. PATENT DOCUMENTS

| | | | | |
|---|---|---|---|---|
| 3,668,909 | A * | 6/1972 | Roberts | 70/411 |
| 4,526,028 | A * | 7/1985 | Hübner | 73/23.2 |
| 4,580,274 | A * | 4/1986 | Debany et al. | 375/228 |
| 4,597,487 | A * | 7/1986 | Crosby et al. | 194/209 |
| 4,984,184 | A * | 1/1991 | Kurita et al. | 700/292 |
| 5,074,137 | A * | 12/1991 | Harris et al. | 73/31.02 |

(Continued)

FOREIGN PATENT DOCUMENTS

| | | |
|---|---|---|
| EP | 0 408 456 | 1/1991 |
| JP | A H03-223992 | 10/1991 |
| JP | A 2001-243120 | 9/2001 |

OTHER PUBLICATIONS

Youren et al., "Digital and optical moire detection of flaws applied to holographic nondestructive testing", 1983.*

(Continued)

*Primary Examiner* — Ondrej Vostal
(74) *Attorney, Agent, or Firm* — Nixon & Vanderhye P.C.

(57) ABSTRACT

An object of the present invention is to provide a mechanism for tamper detection of electronic devices (110) in closed units which is robust and low cost. The object is achieved by a method in an electronic device (110) for detecting if a cover (100) enclosing the electronic device (110) has been opened. The cover (100) comprises an enclosing assembly (250) which is adapted to fasten the cover (100) into a closed position. The electronic (device 110) comprises a non volatile memory (120). The non volatile memory (120) comprises a stored reference signature associated to the enclosing assembly (250) when the cover (100) was fastened into a closed position. The method comprises the following steps: (Creating 1003) a signature associated to the enclosing assembly (250). Comparing (1004) the created signature with the reference signature. Detecting (1007) that the cover 100 has been opened when the comparing (1004) results in a difference.

24 Claims, 5 Drawing Sheets

U.S. PATENT DOCUMENTS

| | | | | |
|---|---|---|---|---|
| 5,365,074 | A * | 11/1994 | Genovese | 250/559.29 |
| 5,508,687 | A * | 4/1996 | Gebhardt et al. | 340/5.26 |
| 5,579,002 | A * | 11/1996 | Iggulden et al. | 341/23 |
| 5,798,787 | A * | 8/1998 | Yamaguchi et al. | 348/152 |
| 5,806,237 | A * | 9/1998 | Nelson et al. | 43/131 |
| 5,903,217 | A * | 5/1999 | Stanczak et al. | 340/554 |
| 5,963,300 | A * | 10/1999 | Horwitz | 351/209 |
| 5,969,637 | A * | 10/1999 | Doppelt et al. | 340/12.55 |
| 6,028,537 | A * | 2/2000 | Suman et al. | 340/988 |
| 6,094,136 | A * | 7/2000 | Wyman | 340/541 |
| 6,125,180 | A * | 9/2000 | Lester et al. | 379/433.03 |
| 6,281,787 | B1 * | 8/2001 | Lerg et al. | 340/442 |
| 6,736,510 | B1 * | 5/2004 | Van Heugten | 351/221 |
| 7,065,477 | B2 * | 6/2006 | Fukuda et al. | 703/6 |
| 7,123,159 | B2 * | 10/2006 | Giannopoulos et al. | 340/815.45 |
| 7,301,163 | B2 * | 11/2007 | Brill et al. | 250/548 |
| 7,570,198 | B2 * | 8/2009 | Tokoro | 342/70 |
| 7,602,275 | B2 * | 10/2009 | Dishongh et al. | 340/309.16 |
| 2001/0033012 | A1 | 10/2001 | Koemmerling et al. | |
| 2002/0125907 | A1 * | 9/2002 | Kurtulik et al. | 324/765 |
| 2003/0138135 | A1 * | 7/2003 | Chung et al. | 382/119 |
| 2003/0140664 | A1 * | 7/2003 | Swertz | 70/225 |
| 2003/0225497 | A1 * | 12/2003 | Whinnery | 701/49 |
| 2004/0072579 | A1 * | 4/2004 | Hottinen | 455/456.1 |
| 2004/0093171 | A1 * | 5/2004 | Lawryshyn et al. | 702/50 |
| 2004/0222014 | A1 | 11/2004 | Heffner | |
| 2005/0039040 | A1 | 2/2005 | Ransom et al. | |
| 2006/0084848 | A1 * | 4/2006 | Mitchnick | 600/301 |
| 2006/0092074 | A1 * | 5/2006 | Collins et al. | 342/160 |
| 2006/0109113 | A1 * | 5/2006 | Reyes et al. | 340/541 |
| 2006/0149496 | A1 * | 7/2006 | Takeuchi | 702/150 |
| 2008/0024902 | A1 * | 1/2008 | Slafer | 360/72.1 |
| 2008/0109430 | A1 * | 5/2008 | Lee | 707/6 |
| 2008/0149584 | A1 * | 6/2008 | Martinelli | 215/201 |
| 2008/0303663 | A1 * | 12/2008 | Smith et al. | 340/550 |
| 2009/0108988 | A1 * | 4/2009 | Cleveland et al. | 340/5.52 |
| 2009/0109401 | A1 * | 4/2009 | Van Heugten | 351/221 |
| 2009/0303057 | A1 * | 12/2009 | Brown | 340/605 |
| 2010/0265069 | A1 * | 10/2010 | Michaels et al. | 340/572.3 |

OTHER PUBLICATIONS

Wehrs, "Detection of Plugged Impulse Lines Using Statistical Process Monitoring Technology", 2006.*

English Summary of Japanese official action, Dec. 9, 2011 in corresponding Japanese Application No. 2010-543076.

International Search Report for PCT/SE2008/050043, mailed Aug. 29, 2008.

International Preliminary Report on Patentability for PCT/SE2008/050043, completed Mar. 9, 2010.

* cited by examiner

METHOD AND DEVICE FOR DETECTING THE OPENING OF A COVER ENCLOSING THE DEVICE

This application is the U.S. national phase of International Application No. PCT/SE2008/050043, filed 16 Jan. 2008, the entire contents of which is hereby incorporated by reference.

TECHNICAL FIELD

The technology relates to the detection of opening of a cover enclosing an electronic device.

BACKGROUND

An electronic device of today most often comprises software components and hardware components. Software components are a collection of computer programs, procedures that perform some task in the electronic device. Hardware components encompass the physical interconnections and devices required to store and execute the software instructions. Hardware components are often implemented as at least one printed circuit board. Printed circuit boards mechanically support and electrically connect the electronic components of the electronic device using conductive pathways, or traces, etched from copper sheets laminated onto a non-conductive substrate. Alternative names are printed wiring board and etched wiring board. Printed circuit boards are often placed in open boards, racks or in covers, such as e.g. closed units or encapsulated units. A cover has one or several printed circuit boards placed in a case such as e.g. a metallic or plastic cabinet. Covers may be used to comprise electronic devices.

Type approval is granted to a product, such as an electronic device, that meets a minimum set of regulatory technical and safety requirements. Generally, type approval is required before a product is allowed to be sold in a particular country, so the requirements for a given product will vary around the world. Compliance to type-approval requirements is often denoted by a marking e.g. on the back of the product. An example of such a type-approval mark is the familiar Conformité Européenne (CE) mark which means that the marked product has obtained type approval in the European Union. Another example is the China Compulsory Certificate mark, commonly known as CCC Mark, which is a compulsory safety mark for many products sold on the Chinese market. The type approval of a product is based on the use of specific components. In case the specific type approved components are substituted by non type approved components, the type approval is void and usage of the electronic device/product could be in violation with national regulations.

Electronic devices require handling when the equipment failures or service malfunctioning occurs. Authorized handling of the electronic devices, such as e.g. repairs is performed by authorized personnel, such as e.g. personnel from the equipment provider or personnel from authorized repair providers. Further the authorized handling is performed with approved components and approved test methods to ensure high performance and ensure the maintaining of the type approval of the device.

Unauthorized handling, i.e. handling performed by e.g. Independent Repair Providers (IRP) i.e. others than those authorized, is often be performed with non approved components and methods for test and calibration, with may result in quality problems. The quality problems may be the electronic device's lessening performance and poorer functionality caused by the unauthorized handling. The quality problems may in turn lead to multiple repairs and a successive degradation of the network.

Without reliable possibilities to detect unauthorized handling of electronic devices, the providers end up in a difficult situation. The HW warranty is void but burden of proof is on the providers of the electronic devices. Even when a suspected unauthorized handling of electronic devices is detected the problem remains to prove it.

Today it is not possible to detect unauthorized handling remotely. Instead the method used is manual inspection, such as e.g. careful visual inspection, of the electronic device. Manual inspection is costly and only possible at central handling sites. Since it is most unlikely that the electronic devices are located at the central handling centre, only those devices that are situated at the central handling site may be easily manually inspected. The other devices that are located elsewhere require transportation and, accordingly, disconnection which is time consuming and thus costly.

Another method used today to detect if electronic devices are handled by unauthorized personnel is to facilitate the manual inspection by applying a sealing arrangement, such as e.g. a seal of lacquer or similar, to the cover enclosing the electronic device. The sealing arrangement is broken each time the cover enclosing the electronic device is handled, i.e. opened, thus distinctly indicating that some handling of the electronic device has occurred. However, replacing the seal in order to conceal handling of the cover enclosing the electronic devices is not that difficult. That is to say that the sealing arrangement is too easily fiddled with, to ensure a reliable and trustworthy method of detecting unauthorised handling of electronic devices.

SUMMARY

It is therefore an object to provide a mechanism for detecting if a cover enclosing an electronic device has been opened which are robust and low cost.

A first aspect provides a method in an electronic device for detecting if a cover enclosing the electronic device has been opened. The cover comprises an enclosing assembly which is adapted to fasten the cover into a closed position. The electronic device comprises a non volatile memory. The non volatile memory stores a reference signature associated to the enclosing assembly when the cover was fastened into a closed position. The method comprises the following steps: creating a signature associated to the enclosing assembly; comparing the created signature with the reference signature; and detecting that the cover has been opened when the comparing results in a difference.

A second aspect is an arrangement in an electronic device enclosed by a cover. The cover comprises an enclosing assembly. The enclosing assembly comprises a first fastening element and a second fastening element. The first fastening element and second fastening element are adapted to fasten the cover into a closed position. The electronic device further comprises a non volatile memory that stores a reference signature associated to the enclosing assembly when the cover was fastened into a closed position. The electronic device further comprises: a signature creating unit adapted to create a signature associated to the enclosing assembly; a signature comparing unit adapted to compare the created signature with the reference signature; and a detection unit adapted to detect that the cover has been opened when the comparing results in a difference.

The creation of a unique signature each time the electronic device is powered on and the subsequent comparison between the created signature and a reference signature permits ready detection if the cover enclosing the electronic device has been opened since the creating of the reference signature.

The methods and arrangements according to the present solution are very advantageous.

Firstly since the method and arrangement are generic to all electronic devices and thus vendor independent and may easily be used for many different electronic devices.

Secondly the present solution is cost effective since the costs of implementing the solution, i.e. producing and installing the parts required for the method and arrangement according to the solution are minor.

Thirdly, the present solution is robust since the method still works even though one or several second fastening elements are damaged.

Fourthly, the present solution is very difficult to tamper with because the signature is created inside the box when the box is closed.

Fifthly the method may be performed remotely which improves the handling of the electronic device in terms of time and money.

DETAILED DESCRIPTION

Figure 1:
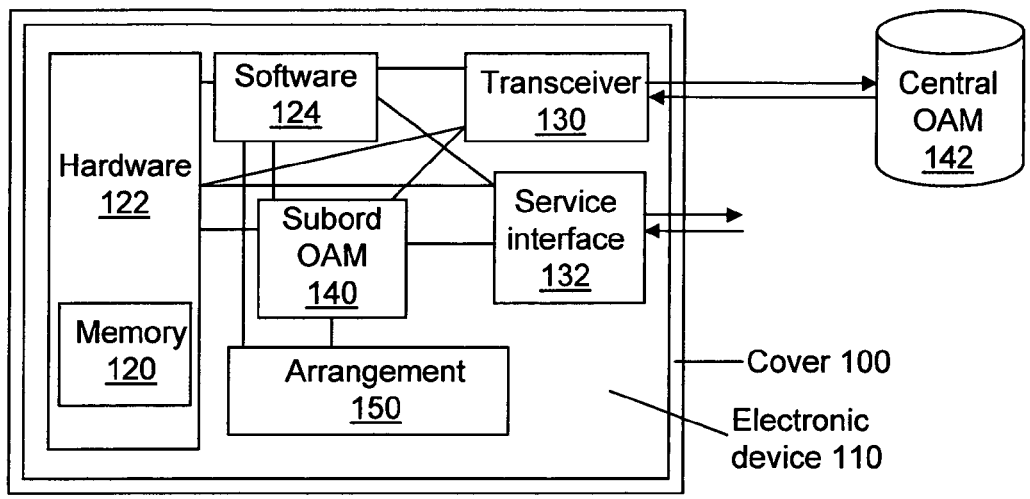
FIG. 1 is a schematic block diagram illustrating embodiments of a cover enclosing an electronic device.

FIG. 1 depicts a cover 100 enclosing an electronic device 110. The electronic device 110 may e.g. be a radio base station, a radio network controller, a wireless communication node, a wireline communication node or any other power supplied device with a cover. The cover 100 may e.g. be a case, a casing arrangement or an encapsulated unit. The electronic device 110 comprises a non volatile memory 120 which may be comprised in a hardware component 122 such as e.g. a printed circuit board. The electronic device 110 may further comprise a software component 124. The hardware component 122 and the software component 124 are adapted to be connected to each other.

The electronic device 110 may further comprise a transceiver 130 adapted to send and receive information to and from the electronic device 110. The transceiver 130 is adapted to be connected to the hardware component 122 and the software component 124. Further the electronic device 110 may comprise a service interface 132. The service interface 132 may be adapted to be connected to the software component 124 and/or the hardware component 122. The service interface 132 is adapted to enable authorized personnel on site to access the software component 124 and/or the hardware component 122 to perform e.g. maintenance and repair.

The electronic device 110 may further comprise a subordinate Operation And Maintenance (OAM) system component 140. The subordinate OAM-system component 140 may be adapted to communicate with a central controlling OAM-system component 142 e.g. located elsewhere, such as e.g. at an authorized repair centre, thus enabling remote handling of the electronic device via the transceiver 130 comprised in the electronic device 110.

The subordinate OAM-system component 140 may be adapted to be connected to the software component 124 and/or to the hardware component 122 and to the transceiver 130. The subordinate OAM-system component 140 may be adapted to report status information and execute management tasks either automatically or on demand. The reporting of status information and execution of management tasks may be initiated automatically and/or regularly by the central controlling OAM-system component 142 or initiated manually by authorized repair personnel handling the OAM-system.

The authorized repair personnel may either interface the subordinate OAM-system component 140 directly, e.g. via the service interface 132 of the electronic device 110, or use the transceiver 130 to interface via the central controlling OAM-system component 142 located elsewhere, such as e.g. at an authorized repair centre, thus enabling remote handling of the electronic device.

The electronic device 110 further comprises an arrangement 150 required to perform the methods described below.

Figure 2:
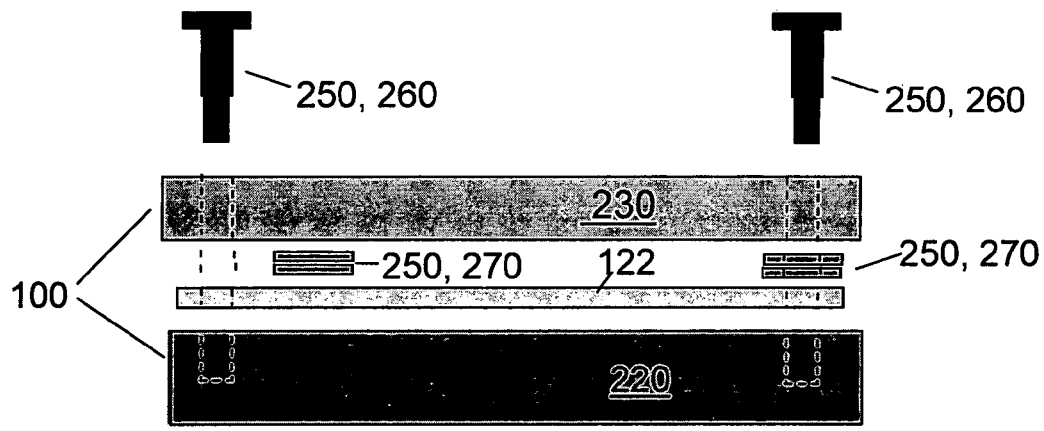
FIG. 2 is a schematic side view illustrating embodiments of a cover enclosing an electronic device.

The cover 100 comprises parts that are arranged together. The cover 100 may be metallic, plastic, composite, wood or made of any other suitable material. In the example of FIG. 2, the cover 100 is shown comprising two parts, a cover base plate 220 and a cover lid 230. Further in the example of FIG. 2, the hardware component 122 of the enclosed electronic device 110 is seen being placed between the cover base plate 220 and the cover lid 230, thus being enclosed by the cover 100. The cover base plate 220 and cover lid 230 are arranged together to enclose the electronic device 110, by means of an enclosing assembly 250.

In the example of FIG. 2 the enclosing assembly 250 comprises a first fastening element 260 and a second fastening element 270. The first fastening element 260 may be e.g. a screw, a bolt, a clench, a rivet and a pop rivet. The first fastening element 260 may e.g. comprise a shaft and a head and being adapted to be attached to the cover lid 230 and/or the cover base 220, thus enabling the enclosing of the cover 100. According to some embodiments the fastening element 260 may comprise a helical groove or thread formed on the surface of the shaft and provision at the head to turn the first fastening element 260. The first fastening element 260 may be rotatable around the shaft, i.e. around the axis represented by the shaft. The first fastening element 260 may be used to translate torque into linear force. The first fastening element 260 may be used together and/or in combination with the second fastening element 270.

The second fastening element 270 may be e.g. a bracket, a ferrule, a plate, a washer, a tray or a chip. The second fastening element 270 is adapted to level out the pressure of the head of the first fastening element 260 when the first fastening element 260 and the second fastening element 270 are used together as a threaded fastener to hold objects together. The second fastening element 270 may comprise a central through hole adapted to put the first fastening element 260 through. According to some embodiments the first fastening element 260 may be put through the cover lid 230, using e.g. a hole of the cover lid 230. Further the first fastening element 260 may be put through the central through hole of the second fastening element 270. Finally the first fastening element 260 may be fastened to a fastening foundation, such as e.g. to the cover base 220 and/or the hardware component 122 thus enclosing the cover 100. The second fastening element 270 may be rotatable around the axis of the first fastening element's 260 shaft, but may also be movable somewhat radial when the first fastening element 260 and second fastening element 270 are being fastened.

According to the embodiments wherein the second fastening element 270 comprises a central through hole, the diameter of the central through hole may be considerably larger than the diameter of the shaft of the first fastening element 260 in order to firstly enable the second fastening element 270 to thread on the first fastening element 260 and secondly to further enable the radial movement of the second fastening element 270. As seen in FIG. 2 the second fastening element 270 may be placed anywhere between the cover lid 230 and the cover base 220 when the cover 100 is closed.

The technology described creates signatures associated with the enclosing assembly 250 which are used to detect opening when the cover is powered on again. The status of the cover enclosing the electronic device, such as e.g. an unauthorized opening or not, may be indicated remotely or at an authorized repair centre. Further the technology is easy to reset during authorized handling such as e.g. during repair at authorized repair centres, and consequently difficult to reset by unauthorized personnel. A unique signature may be created each time the electronic device is powered on, and a subsequent comparison between the created signature and a reference signature may be performed to detect if the cover enclosing the electronic device has been opened since the creating of the reference signature.

According to some embodiments, the signature associated to the enclosing assembly 250 may be created by registering the position of some of the second fastening elements 270. The position of the at least one pair of second fastening elements 270 will differ each time the cover 100 enclosing the electronic device 110 is opened, i.e. each time the attaching means 250 are disassembled and/or assembled. According to some embodiments the signature is created using the principle of registering the relationships between the physical positions of the first fastening element 260 and second fastening element 270 and the hardware component 122. These relationships are altered each time the unit is assembled or disassembled and thereby a unique signature is created.

These embodiments are tamper proof since, it is almost impossible to place the second fastening element 270 in identical position two times in a row, and there is no possibility to adjust the second fastening element 270 because of its placement inside the cover 100. According to some embodiments at least two second fastening elements may 270 be used when creating a signature. The at least two second fastening elements 270 may then be placed on top of each other. The creation of the signature of the position of the second fastening elements 270 may be performed by registering their mutual relative positions. According to some embodiments the estimation of the mutual relative positions may be performed by creating an optical pattern of the mutual relative positions of the second fastening elements 270 by means of a light source and a light detector.

According to some embodiments the illumination of the second fastening elements 270 may be performed by a light source such as e.g. a polarized light source or a non polarized light source. The light generated by the light source may further be either visible or non visible to the human eye. The light source may illuminate the second fastening elements 270 either directly or indirectly via reflection. The light detector adapted to detect the optical pattern created when illuminating the second fastening elements 270 may be a photo sensor or an optoelectronic device such as a simple black and white line Charge Coupled Device (CCD) or a colour line CCD. The created optical pattern may be detected as soon as the light source is activated. The optoelectronic device is adapted to detect the optical pattern and adapted to transform the detected optical pattern to a set of electrical values. Thus a unique signature associated with the enclosing assembly 250, comprising a set of electrical values, is created. The light detector is preferably located close enough to the second fastening elements 270 to be able to detect the created optical pattern.

Figures 3A, 3B:
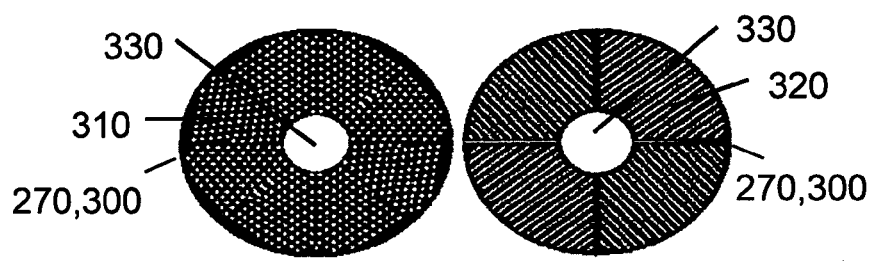
FIGS. 3a and 3b are schematic views illustrating embodiments of brackets used when closing a cover enclosing an electronic device.

According to some embodiments, some or all of the second fastening elements 270 may be represented by a hole pattern element 300. The hole pattern element 300 comprises a through hole pattern adapted to enable creation of optical patterns when being illuminated. FIG. 3a presents an example of such a hole pattern element 300 comprising the hole pattern 310 and the central through hole 330. FIG. 3b shows another example of a hole pattern element 300 comprising the hole pattern 320 and the central through hole 330. The central through hole 330 may be excluded according to some embodiments. The design of the different hole patterns 310, 320 of the hole pattern elements 300 may be performed in a number of ways. The exemplary designs of hole patterns 310, 320 are not to be seen as limiting but only as two exemplary designs among many.

In some embodiments only one hole pattern element 300 may be used to create an optical pattern. Then it is an advantage to design the hole pattern to be more complex to enable the created optical pattern to be more distinct.

According to some embodiments at least two hole pattern elements 300 may be combined by placing the hole pattern elements 300 on top of each other to create an optical pattern. According to some embodiments the hole pattern elements 300 may be piled on top of each other so that the first fastening element may be put through the central through hole 330 of the piled hole pattern elements 300 as seen in FIG. 2. Several hole pattern elements 300 all comprising the hole pattern 310 may be combined or several hole pattern elements 300 comprising each a different hole pattern 310, 320 may be combined. The complexity in the design of hole patterns 310, 320 may be less when combining several hole pattern elements 300 which is advantageous because then the hole pattern elements 300 that are less expensive to manufacture may be used.

Figures 4A, 4B, 4C, 4D:
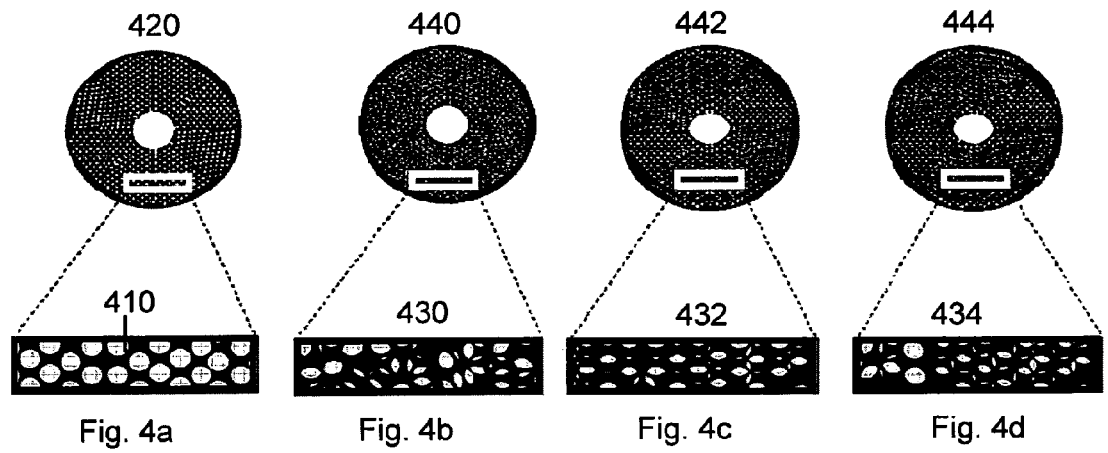
FIGS. 4a, 4b, 4c, 4d are schematic views illustrating embodiments of brackets used when closing a cover enclosing an electronic device.

FIG. 4a shows a detail 410 of such an exemplary created optical pattern 420, being the result of illuminating one hole pattern element 300. FIGS. 4b, 4c and 4d further shows the details 430, 432 and 434 of the respective exemplary optical patterns 440, 442, and 444, being the results of illuminating at least two identical hole pattern elements 300 placed on top of each other but placed in different horizontal mutual positions to each other.

The exemplary optical patterns 440, 442 and 444 created by illuminating two hole pattern elements 300 may be unique Moiré patterns. A Moiré pattern is an interference fringe pattern that occurs when the optical resolution coincides with the resolution of the details of the object to be depicted. Thus, if the object to be depicted, such as e.g. a hole pattern element 300, comprises areas with repetitive detail which exceeds the resolution of the detector then a wavy moiré pattern will appear. Moiré patterns are caused by interference between two or more sets of fine pattern grids. Hence when the hole pattern 310, 320 of the hole pattern elements 300 comprises enough detail, the Moiré pattern is created. The Moiré pattern easily changes its appearance since it is dependent of such small details. Thereby will every change, including the ever so small changes in the mutual positions of the hole pattern elements 300 on top of each other, result in a different Moiré pattern.

The at least two hole pattern elements 300 being combined to create an optical pattern, such as 440, 442, 444, may have identical or different hole patterns 310, 320. In the example of FIG. 4 identical hole patterns 310 are used to create the optical patterns 440, 442, 444.

To further enable changes in the mutual positions of the two hole pattern elements 300 on top of each other, and thus enabling more variations to create optical patterns such as Moiré patterns, the central through hole 330 in the hole pattern element 300 may have a diameter that substantially larger than the diameter of the first fastening element 260 and thereby enabling radial movement of the hole pattern element 300.

Figures 5A, 5B:
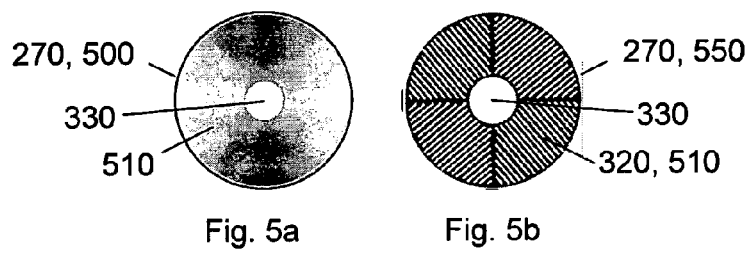
FIGS. 5a and 5b are schematic views illustrating embodiments of brackets used when closing a cover enclosing an electronic device.

According to some embodiments some or all of the second fastening elements 270 may comprise a pattern of color and/or polarization adapted to enable creation of optical patterns when being illuminated. FIG. 5a shows an example of such a pattern element 500 with the colour and/or polarization pattern 510. The pattern 510 may comprise transparently coloured and/or polarized sections. The pattern element 500 may comprise a central through hole 330. To add further sophistication to the creation of patterns, the second fastening element 270 according to some embodiments may be a combination of a hole pattern element 300 and a pattern element 500. FIG. 5b presents an example of such a combined pattern element 550 comprising both the hole pattern 320 and the color and/or polarization pattern 510.

Figure 6:
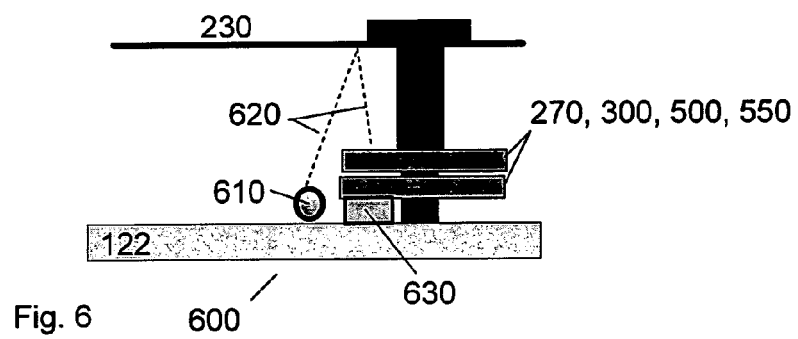
FIG. 6 is a schematic side view illustrating embodiments of a cover enclosing an electronic device.

FIG. 6 shows an example according to the embodiments wherein the second fastening elements 270 are represented by hole pattern elements 300 and/or pattern elements 500 and/or combined pattern elements 550. FIG. 6 depicts a detail 600 of the cover 100 which detail 600 comprises the light source 610 located on the hardware component 122. The light source 610 illuminates 620 the two second fastening elements 270 via reflection in the cover lid 230. As previously mentioned, there has to be at least two hole pattern elements 300, on top of each other being illuminated 620 to create a unique optical pattern 440, 442, 444 such as e.g. a Moiré pattern, which will serve as a unique signature associated with the second fastening elements 270. The light detector 630, in example of FIG. 6 implemented as an optoelectronic device, is placed on the hardware component 122. The light detector 630 is located close enough to the second fastening elements 270 to be able to detect the created optical pattern 440, 442, 444. According to some preferred embodiments the light detector 630 may be located horizontal to the second fastening elements 270. The example of FIG. 6 shows the second fastening elements 270 comprising central through holes 330 through which the first fastening element 260 is put. Note that this is not to be regarded as limiting the present solution since the second fastening element 270, i.e. the hole pattern elements 300 and/or pattern elements 500 and/or combined pattern elements 550, may be placed anywhere between the cover lid 230 and the cover base 220 when the cover 100 is closed as seen in FIG. 2.

Figure 7A:
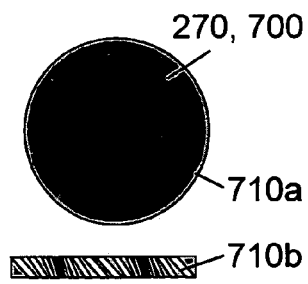
FIGS. 7a, 7b, 7c and 7d are schematic views illustrating embodiments of brackets used when closing a cover enclosing an electronic device.
Figure 7B:
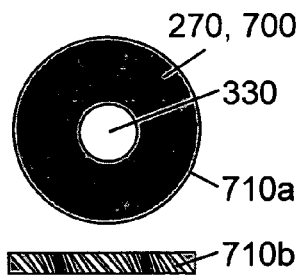
Figure 7C:
Figure 7D:

According to some embodiments, some or all of the second fastening elements 270 may comprise an edge pattern adapted to enable creation of optical patterns when being illuminated. FIG. 7a shows an example of such an edge pattern element 700 comprising an edge pattern 710. The edge pattern 710 is situated on the edge of the edge pattern element 700. FIG. 7b shows another example of such an edge pattern element 700 comprising a central through hole 330 and an edge pattern 710 on the edge of the edge pattern element 700. The edge pattern 710 is situated on the edge of the edge pattern element 700. In FIGS. 7a and 7b the edge pattern 710 is seen from above as 710a and also seen from the side as 710b, i.e. directly looking at the edge of the edge pattern element 700. The edge pattern 710 may be implemented such as e.g. a grooved pattern or a relief pattern and/or comprising different colours and or textures. The edge pattern 710 is also intended to be illuminated to create a unique optical pattern. To further enable the creation of different optical patterns and/or to add more detail to the optical patterns being created several edge pattern elements 700 may be used in combination. Several different edge patterns 710 may be used in combination, but only one edge pattern 710 is required to execute the method according to the present solution. FIGS. 7c and 7d show two such exemplary optical patterns 720 and 722 being the results of illuminating a combination of several edge pattern elements 700. It is an advantageous solution to use the pattern edge elements 700 since they are easily and inexpensively manufactured.

Figure 8:
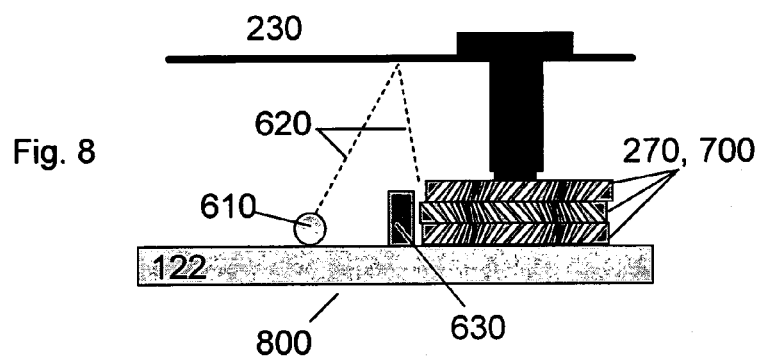
FIG. 8 is a schematic side view illustrating embodiments of a cover enclosing an electronic device.

FIG. 8 shows a detail 800 of the cover 100 enclosing the electronic device 110 according to some embodiments. The electronic device 110 comprises the light source 610 located on the hardware component 122. The light source 610 illuminates 620 three edge pattern elements 700 via reflection in the cover lid 230. The light detector 630, in example of FIG. 8 implemented as an optoelectronic device, is placed on the hardware component 122. The light detector 630 must be located close enough to the second fastening elements 270 to be able to detect the created optical pattern 720, 722. According to some preferred embodiments the light detector 630 may be located vertically to/beside the second fastening elements 270.

Figure 9:
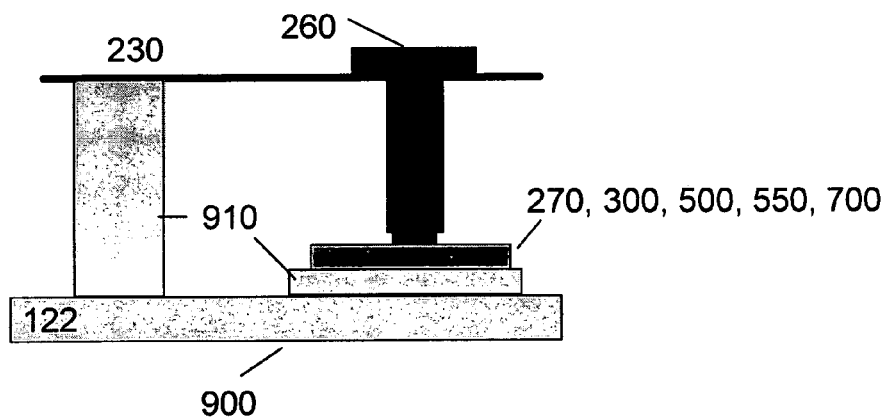
FIG. 9 is a schematic side view illustrating embodiments of a cover enclosing an electronic device.

According to some embodiments, the signature associated to the enclosing assembly 250 may be created by registering the pressure of the first fastening element 260 since the pressure will most probably differ each time the cover 100 enclosing the electronic device 110 is opened, i.e. each time the enclosing assembly 250 is disassembled and/or assembled. FIG. 9 shows a detail 900 of the cover 100 enclosing the electronic device 110 according to some embodiments. The electronic device 110 may comprise a pressure detector 910 located on the hardware component 122. The pressure detector 910 is adapted to detect the pressure of the first fastening element 260. The pressure detector 910 may be located in direct contact with the first fastening element 260. The pressure detector 910 may be located to detect the pressure of the first fastening element 260 indirectly, e.g. by being located in contact with the cover lid 230 and/or cover base plate 220 and/or the hardware component 122. The pressure detector 910 may comprise means for analogue-to-digital conversion adapted to deliver an electric signal representing the detected pressure of the first fastening element 260. The electrical signal representing the detected pressure or combination of values, such as i.e. to combine the simultaneously detected pressure values of several first fastening devices 260 of the cover 100 may be used as the signature associated to the enclosing assembly 250.

Figure 10:
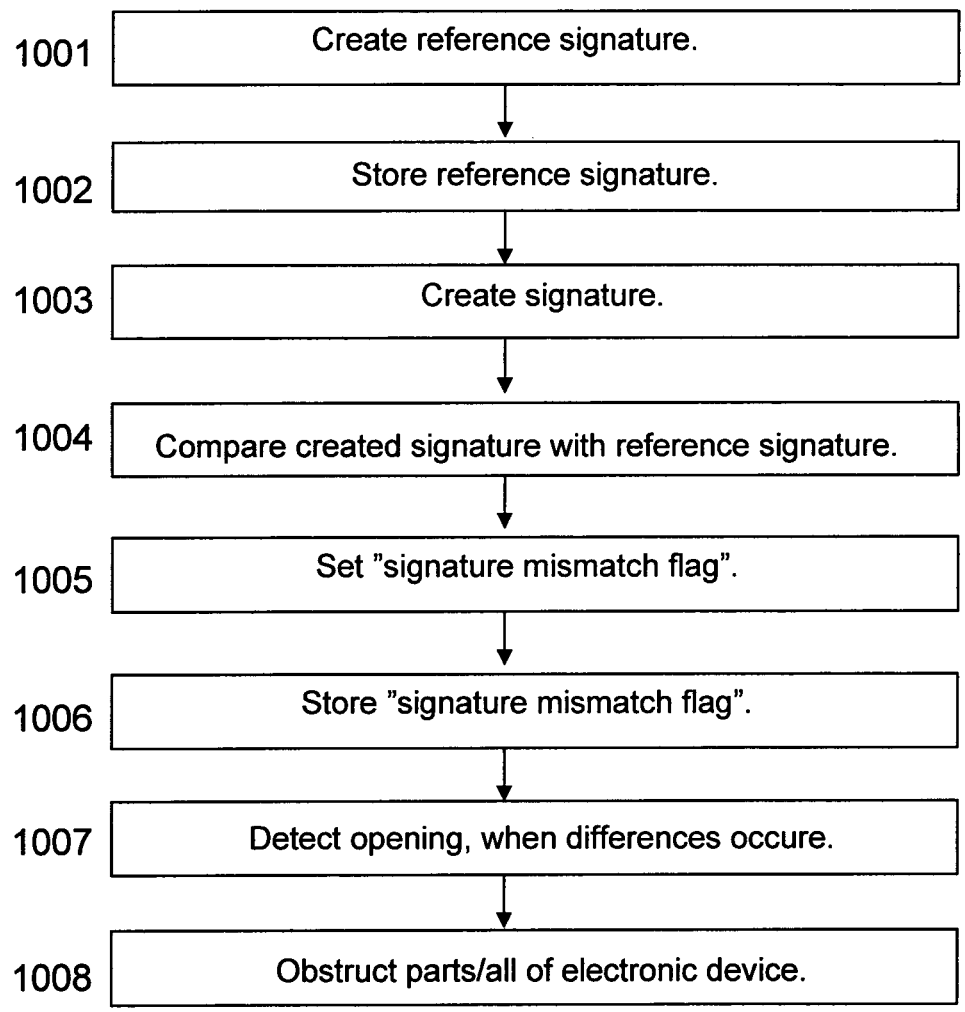
FIG. 10 is a flow chart illustrating method steps of some embodiments performed in a cover enclosing an electronic device.

FIG. 10 presents the method steps in the electronic device 110 for detecting if a cover 100 enclosing an electronic device 110 has been opened from a closed position.

Note that the described method may be performed using one enclosing assembly 250 of the cover 100 only, or performed using several or all enclosing assemblies 250 of the cover 100.

The method comprises the following steps:

1001. This method step is optional. A reference signature which may be associated to the second fastening element 270 is created. How this is performed will be described more in detail in the method steps of 1003-1005 below. This step may be performed in a protected process. The protected process may e.g. be to use encryption or passwords or special test or maintenance equipment.

1002. In this method step which also is optional and relates to some embodiments, the created reference signature is stored. This may be performed by storing the created reference signature in the non volatile memory 120. This step may also be performed in a protected process, as described above in step 1001.

1003. In this step a signature associated to the enclosing assembly 250 when the cover 100 was fastened into a closed position, is created.

According to some embodiments the enclosing assembly 250 may comprise a first fastening element 260 and this step may in this case be performed by creating a signature of the pressure of the first fastening element 260.

According to some embodiments the enclosing assembly 250 may comprise a second fastening element 270 and this step may in this case be performed by creating a signature of the mutual position of the second fastening element 270.

According to some embodiments, the second fastening element 270 may be represented by a hole pattern element 300 comprising through holes arranged in a pattern. This step may in this case be performed by illuminating the hole pattern element 300, and by registering the created optical pattern 420, 440, 442, 444.

According to some embodiments, the second fastening element 270 may be represented by a pattern element 500 comprising a pattern comprising transparently coloured and/or polarized sections. The pattern element 500 may be adapted to create an optical pattern when being illuminated. This step may in this case be performed by illuminating the pattern element 500, and by registering the created optical pattern.

According to some embodiments the second fastening element 270 may be represented by an edge pattern element 700 comprising an edge pattern 710 arranged on the edge of the edge pattern element 700. In this case the edge pattern element 700 may create an optical pattern when being illuminated. This step may in this case be performed by illuminating the edge pattern element 700 and by registering the created optical pattern 720, 722.

According to some embodiments to add further sophistication to the creation of patterns, the second fastening element 270 may be a combination of any of the hole pattern element 300 and/or the pattern element 500 and/or the edge pattern element 700.

According to some embodiments creating the signature may be performed using relative values.

According to some embodiments creating the signature may be performed each time the electronic device 110 is powered on.

According to some embodiments the electronic device 110 may further comprise a subordinate OAM-system component 140 adapted to communicate with a central controlling OAM-system component 142, this step may be initiated via the central controlling OAM-system component 142.

According to some embodiments this step may be initiated manually via the service interface 132.

According to some embodiments this step may be initiated by activating a built-in sensor such as e.g. by pressing a dedicated switch. The built-in sensor may be used exclusively for this purpose or may be used for other actions as well.

1004. This step regards comparing of the created signature with the reference signature. According to some embodiments this step may be performed each time the electronic device 110 is powered on.

1005. In this optional step relating to some embodiments, a "signature mismatch flag" is set when a difference occurs in the comparing of the created signature and the reference signature. According to some embodiments this step may be performed each time the electronic device 110 is powered on.

1006. In this optional step relating to some embodiments, the "signature mismatch flag" is stored when a difference occurs during comparing of the created signature with the reference signature.

According to some embodiments the "signature mismatch flag" may be stored in the non volatile memory 120. According to some embodiments this step may be performed each time the electronic device 110 is powered on.

1007. In this step it is detected that the cover 100 has been opened when the comparing of the created signature with the reference signature resulted in a difference.

According to some embodiments this step may be performed by checking if the "signature mismatch flag" is set. According to some embodiments this step may be performed each time the electronic device 110 is powered on.

1008. To obstruct parts or the entire electronic device 110 is an optional step which may be performed when the "signature mismatch flag" is set.

According to some embodiments this step may be performed after a predetermined time interval.

According to some embodiments this step may be performed each time the electronic device 110 is powered on.

The method is performed in the electronic device 110 which now will be described in a general way. As mentioned above, the electronic device 110 is enclosed by the cover 100. The cover 100 comprises the enclosing assembly 250. The enclosing assembly 250 comprises the first fastening element 260 and the second fastening element 270. The first fastening element 260 and the second fastening element 270 are adapted to fasten the cover 100 into a closed position.

The second fastening element 270 may be represented by a hole pattern element 300 which may comprise a plurality of through holes arranged in a pattern 310, 320. The hole pattern element 300 may be adapted to create an optical pattern 420, 440, 442, 444 when being illuminated.

The second fastening element 270 may be represented by a pattern element 500. The pattern element 500 may comprise a pattern 510 of transparently coloured and/or polarized sections. The pattern element 500 may be adapted to create an optical pattern when being illuminated. This step may in this case be performed by illuminating the pattern element 500, and by registering the created optical pattern.

The second fastening element 270 may be represented by an edge pattern element 700. The edge pattern element 600 may comprise an edge pattern 710 on the edge of the edge pattern element 700. The edge pattern 710 may be adapted to create an optical pattern 720, 722 when being illuminated.

The hole pattern element 300, the pattern element 500 and or edge pattern element 700 may have a central through hole 330 whose diameter is substantially larger than the diameter of the first fastening element 260 and thereby enabling radial movement as well as rotating movement of the hole pattern element 300, the pattern element 500 and/or the edge pattern element 700 when fastening the cover 100.

The electronic device 110 comprises the non volatile memory 120. The non volatile memory 120 comprises the stored reference signature associated to the enclosing assembly 250 when the cover 100 was fastened into a closed position.

Figure 11:
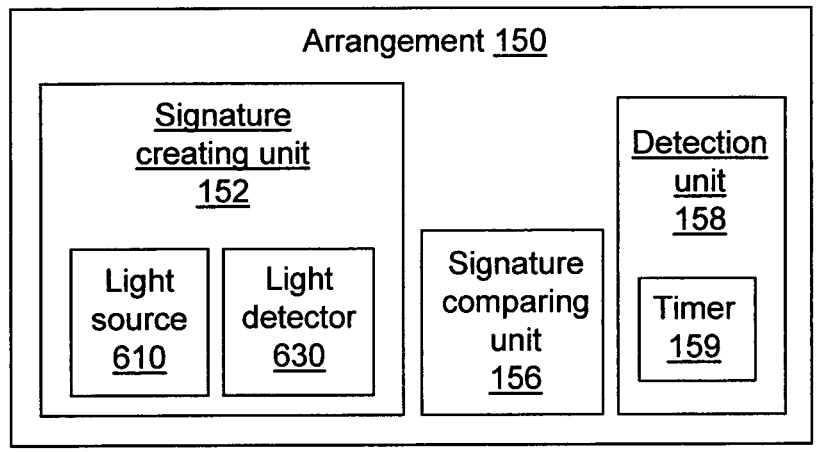
FIG. 11 is a schematic block diagram illustrating embodiments of an arrangement in an electronic device enclosed by a cover.

To perform the method steps for detecting if the cover 100 enclosing the electronic device 110 has been opened from a closed position, the electronic device 110 comprises the arrangement 150 depicted in FIG. 11. The electronic device arrangement 150 comprises a signature creating unit 152 adapted to create a signature associated to the enclosing assembly 250. The signature creating unit 152 may further be adapted to create a reference signature associated to the enclosing assembly 250.

Figure 12:
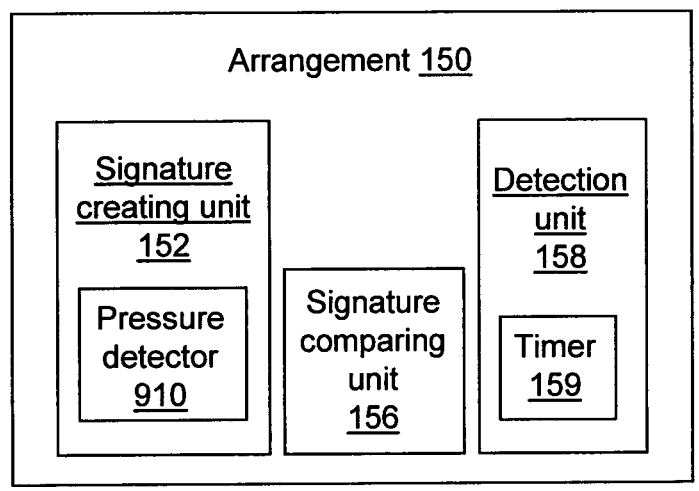
FIG. 12 is a schematic block diagram illustrating embodiments of an arrangement in an electronic device enclosed by a cover.

As depicted in FIG. 12 the signature creating unit 152 may comprise a pressure detector 910 adapted to detect the pressure of the first fastening element 260 when the first fastening element 260 is fastened into a closed position and may further be adapted to create a signature or a reference signature out of the detected pressure. As depicted in FIG. 11, the signature creating unit 152 may comprise a light source 610 adapted to illuminate the second fastening element 270. The signature creating unit 152 may further comprise a light detector 630 which may be adapted to detect the light generated by the light source 610. The light detector 630 may further be adapted to create a signature or a reference signature out of the detected the light.

The electronic device arrangement 150 further comprises a signature comparing unit 156 adapted to compare the created signature with the reference signature.

The electronic device arrangement 150 further comprises a detection unit 158 adapted to detect that the cover 100 has been opened when the comparing results in a difference. The detection unit 158 further may comprise a timer arrangement 159 which may be adapted to delay detecting of opening of the cover 100 when the step of comparing the created signature with the reference signature resulted in a difference.

Regardless of the different embodiments of the method being used to create a signature or a reference signature, the created signature and created reference signature must be robust against misinterpretation. According to some embodiments robustness against misinterpretation is achieved using relative values instead of absolute values when detecting the signature and reference signature. Using relative values may be a good compensation for ageing of the light source 610. Each signature and reference signature may comprise a number of elements, where each element may be represented by a value. To enable the above mentioned robustness, the light detector 630 and/or pressure detector 910 may be adapted to normalize all values of the created signature and created reference signature against the highest value. The normalizing procedure erases/wipes out/minimizes/deletes the background bias created by e.g. fluctuating voltage ageing etc. Each element of the detected signature may also be also given a tolerance area to cope with imperfect element detection.

The methods and arrangements are very advantageous. Firstly the methods and arrangements are generic to all electronic devices 110 enclosed by a cover 100. Secondly, the present solution is cost effective since the costs of implementing the solution, i.e. using pattern second fastening elements instead of ordinary second fastening elements 270 and applying signature creation arrangements to the electronic device 110 are slim/low/small/minor. Thirdly, the present solution is robust seeing that it doesn't matter if one or several second fastening elements 270 are damaged. The only result if one or several second fastening elements 270 are damaged will be that another unique signature will be created. Fourthly, the present solution is very difficult to tamper with because it is almost impossible to place the second fastening element 270 in identical position two times in a row, and there is no possibility to adjust them/it because of their/its placement inside the box The central through hole 330 in the second fastening element 270 may be oversized to further complicate identical positioning of the second fastening elements.

The present methods and arrangements for detection of unauthorized handling of electronic devices can be implemented through one or more processors together with computer program code for performing the functions described. The program code mentioned above may also be provided as a computer program product, for instance in the form of a data carrier carrying computer program code for performing the present method when being loaded into the electronic device 110. One such carrier may be in the form of a CD ROM disc. It is however feasible with other data carriers such as a memory stick. The computer program code can furthermore be provided as pure program code on a server and downloaded to the electronic device 110 remotely.

When using the word "comprise" or "comprising" it shall be interpreted as non-limiting.

The claims are not limited to the above-described example embodiments. Various alternatives, modifications and equivalents may be used.

The invention claimed is:

1. A method in an electronic device for detecting if a cover enclosing the electronic device has been opened from a closed position, the cover comprising an enclosing assembly, the enclosing assembly comprising a first fastening element and a second fastening element, the first fastening element and second fastening element of the enclosing assembly being adapted to fasten the cover into a closed position, the electronic device comprising a non-volatile memory, which memory comprises a stored reference signature associated to the enclosing assembly when the cover was fastened into a closed position, the method comprising the steps of:

creating a unique signature associated to the enclosing assembly each of multiple consecutive times the electronic device is powered-on and each of multiple consecutive times the electronic device is opened from the closed position based on any one of: a unique signature of the pressure of the first fastening element and a unique signature of the mutual position of the second fastening element, wherein the unique signature is created each time the electronic device is powered on and a subsequent comparison between the created signature and a reference signature may be performed to detect if the cover enclosing the electronic device has been opened since the creating of the reference signature, comparing the created signature with the reference signature, and detecting that the cover has been opened and an unauthorized access when the comparing the created unique signature to the reference signature results in a difference.

2. The method according to claim 1, wherein the second fastening element is represented by a hole pattern element comprising through holes arranged in a pattern, the hole pattern element being adapted to create an optical pattern when being illuminated, and wherein the step of creating a unique signature of the mutual position of the second fastening element is performed by illuminating the hole pattern element, and by registering the created optical pattern.

3. The method according to claim 1, wherein the second fastening element is represented by a pattern element comprising a pattern of transparently coloured and/or polarized sections, the pattern element being adapted to create an optical pattern when being illuminated, and wherein the step of creating a unique signature of the mutual position of the second fastening element is performed by illuminating the pattern element, and by registering the created optical pattern.

4. The method according to claim 1, wherein the second fastening element is represented by a edge pattern element comprising a pattern arranged on the edge of the edge pattern element being adapted to create an optical pattern when being illuminated, and wherein the step of creating a unique signature of the mutual position of the second fastening element is performed by illuminating the edge pattern element, and by registering the created optical pattern.

5. The method according to claim 1, wherein the step of creating the unique signature uses relative values.

6. The method according to claim 1, comprising the further steps to be taken after the step of comparing the created signature with the reference signature:

setting a "signature mismatch flag" when a difference occurs, and storing the "signature mismatch flag" when a difference occurs.

7. The method according to claim 6, wherein the step of detecting that the cover has been opened is performed by checking if the signature mismatch flag is set.

8. The method according to claim 7, comprising the further step of obstructing parts or the entire electronic device when the signature mismatch flag is set.

9. The method according to claim 8, wherein the step obstructing parts or the entire electronic device when the signature mismatch flag is set is performed after a predetermined time interval.

10. The method according to claim 1, wherein the step of creating a unique signature and any of the steps comparing the created signature with the reference signature, setting an "signature mismatch flag" when a difference occurs, storing the "signature mismatch flag" when a difference occurs, detecting that the cover has been opened when the comparing results in a difference, and obstructing parts or the entire electronic device when the signature mismatch flag is set is performed each time the electronic device is powered on.

11. The method according to claim 1, wherein the electronic device further comprises a subordinate OAM-system component which is adapted to communicate with a central controlling OAM-system component, and wherein the step of creating a unique signature and any of the steps comparing the created signature with the reference signature, setting an "signature mismatch flag" when a difference occurs, storing the "signature mismatch flag" when a difference occurs, detecting that the cover has been opened when the comparing results in a difference, and obstructing parts or the entire electronic device when the signature mismatch flag is set, is initiated via the central controlling OAM-system component.

12. The method according to claim 1, wherein the step of creating a unique signature and any of the steps and any of the steps comparing the created signature with the reference signature, setting a "signature mismatch flag" when a difference occurs, storing the "signature mismatch flag" when a difference occurs, detecting that the cover has been opened when the comparing results in a difference, and obstructing parts or the entire electronic device when the signature mismatch flag is set, is initiated manually via the service interface.

13. The method according to claim 1, wherein the stored reference signature associated to the second fastening element is created by the further method steps to be taken before the method step of creating a unique signature:

creating the reference signature associated to the second fastening element, and storing the created reference signature.

14. The method according to claim 13, wherein the step of creating the reference signature and the step of storing the created reference signature are performed in a protected process.

15. An electronic device being enclosed by a cover, the cover comprising an enclosing assembly, the enclosing assembly comprising a first fastening element and a second fastening element, the first fastening element and second fastening element being adapted to fasten the cover into a closed position, the electronic device comprising a non-volatile memory, which memory comprises a stored reference signature associated to the enclosing assembly when the cover was fastened into a closed position, wherein the electronic device comprises an arrangement comprising:

a signature creating unit adapted to create a unique signature associated to the enclosing assembly each of multiple consecutive times the electronic device is powered-on and each of multiple consecutive times the electronic device is opened from the closed position based on any one of: a unique signature of a detected pressure of the first fastening element and a unique signature of the mutual position of the second fastening element, wherein the unique signature is created each time the electronic device is powered on and a subsequent comparison between the created signature and a reference signature may be performed to detect if the cover enclosing the electronic device has been opened since the creating of the reference signature, a signature comparing unit adapted to compare the created signature with the reference signature, and a detection unit adapted to detect that the cover has been opened and an unauthorized access when the comparing the created unique signature to the reference signature results in a difference.

16. The electronic device according to the claim 15, wherein the signature creating unit further is adapted to create a reference signature associated to the first fastening element or to the second fastening elements of the enclosing assembly.

17. The electronic device according to claim 16, wherein the second fastening element is represented by a hole pattern element comprising a plurality of through holes arranged in a pattern, the hole pattern element being adapted to create an optical pattern when being illuminated.

18. The electronic device according to claim 16, wherein the second fastening element is represented by a pattern element comprising a pattern of transparently colored and/or polarized sections, the pattern element being adapted to create an optical pattern when being illuminated.

19. The electronic device according to claim 16, wherein the second fastening element is represented by an edge pattern element, the edge pattern elements comprises an edge pattern on the edge of the edge pattern element, the edge pattern being adapted to create an optical pattern when being illuminated.

20. The electronic device according to claim 15, wherein the signature creating unit comprises a pressure detector adapted to detect the pressure of the first fastening element when the first fastening element is fastened into a closed position.

21. The electronic device according to claim 15, wherein the signature creating unit comprises a light source adapted to illuminate the second fastening elements and wherein the signature creating unit further comprises a light detector being adapted to detect the created optical pattern being the result of illuminating the second fastening elements.

22. The electronic device according to claim 15, wherein the detection unit further comprises a timer arrangement adapted to delay the step of detecting of opening of the cover when the comparing resulted in a difference.

23. The electronic device according to claim 15, wherein the hole pattern element and/or the pattern element and/or the edge pattern element has a central through hole whose diameter being substantially larger than the diameter of the first fastening element and thereby enabling radial movement as well as rotating movement of the hole pattern element and/or the pattern element and/or the edge pattern element when fastening the cover.

24. The electronic device according to claim 15, wherein the electronic device is a radio base station.

* * * * *

UNITED STATES PATENT AND TRADEMARK OFFICE
CERTIFICATE OF CORRECTION

PATENT NO. : 8,443,458 B2  
APPLICATION NO. : 12/812177  
DATED : May 14, 2013  
INVENTOR(S) : Lindqvist Page 1 of 1

It is certified that error appears in the above-identified patent and that said Letters Patent is hereby corrected as shown below:

On the Title Page, in Item [57], in Column 2, Lines 1-17, delete "An object....in a difference." and insert -- A mechanism for tamper detection of electronic devices in closed units is robust and low cost. A method in an electronic device detects if a cover enclosing the electronic device has been opened. The cover comprises an enclosing assembly which is adapted to fasten the cover into a closed position. The electronic device comprises a non volatile memory that stores a reference signature associated to the enclosing assembly when the cover was fastened into a closed position. A signature associated to the enclosing assembly is created and compared with the reference signature. The cover is detected as opened when the comparing results in a difference. --, therefor.

On the Title Page, in the Figure, in Step "1007" delete "occure." and insert -- occur. --, therefor.

In the Drawings

Fig. 10, Drawing Sheet 4 of 5, in Step "1007" delete "occure." and insert -- occur. --, therefor.

Signed and Sealed this  
Eighth Day of July, 2014

Michelle K. Lee  
*Deputy Director of the United States Patent and Trademark Office*